(12) United States Patent
Lee et al.

(10) Patent No.: US 10,774,491 B2
(45) Date of Patent: Sep. 15, 2020

(54) OIL FENCE WITH OIL FILTRATION MEMBRANE

(71) Applicant: KOREA INSTITUTE OF SCIENCE AND TECHNOLOGY, Seoul (KR)

(72) Inventors: Heon Ju Lee, Seoul (KR); Myoung-Woon Moon, Seoul (KR); Do Hyun Kim, Seoul (KR); Tae Jun Ko, Seoul (KR); O Chang Kwon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 335 days.

(21) Appl. No.: 15/854,931

(22) Filed: Dec. 27, 2017

(65) Prior Publication Data

US 2018/0179718 A1    Jun. 28, 2018

(30) Foreign Application Priority Data

Dec. 28, 2016  (KR) ........................ 10-2016-0181524

(51) Int. Cl.

| E02B 15/04 | (2006.01) |
|---|---|
| B01D 69/02 | (2006.01) |
| C02F 1/40 | (2006.01) |
| E02B 15/10 | (2006.01) |
| B01D 63/08 | (2006.01) |
| E02B 15/06 | (2006.01) |
| C02F 1/44 | (2006.01) |
| C02F 103/00 | (2006.01) |
| C02F 103/08 | (2006.01) |

(52) U.S. Cl.
CPC .......... *E02B 15/048* (2013.01); *B01D 63/081* (2013.01); *B01D 69/02* (2013.01); *C02F 1/40* (2013.01); *E02B 15/045* (2013.01); *E02B 15/06* (2013.01); *E02B 15/10* (2013.01); *B01D 2325/06* (2013.01); *B01D 2325/08* (2013.01); *B01D 2325/26* (2013.01); *B01D 2325/36* (2013.01); *C02F 1/44* (2013.01); *C02F 2103/007* (2013.01); *C02F 2103/08* (2013.01); *E02B 15/046* (2013.01); *Y02A 20/204* (2018.01)

(58) Field of Classification Search
CPC ............ B01D 2325/06; B01D 2325/08; B01D 2325/26; B01D 2325/36; B01D 63/081; B01D 69/02; C02F 1/40; C02F 1/44; C02F 2103/007; C02F 2103/08; E02B 15/045; E02B 15/046; E02B 15/048; E02B 15/06; E02B 15/10; Y02A 20/204
See application file for complete search history.

(56) References Cited

U.S. PATENT DOCUMENTS

| 2015/0259221 A1 | 9/2015 | Moon et al. |
| 2017/0210643 A1 | 7/2017 | Sato et al. |

FOREIGN PATENT DOCUMENTS

| JP | 2012-180733 A | 9/2012 |
| JP | 2016-064393 A | 4/2016 |
| KR | 10-2009-0080665 A | 7/2009 |
| KR | 10-1149032 B1 | 5/2012 |
| KR | 10-2015-0108287 A | 9/2015 |

*Primary Examiner* — Dirk R Bass
(74) *Attorney, Agent, or Firm* — Rabin & Berdo, P.C.

(57) ABSTRACT

An oil fence including an oil filtration membrane includes: a floating member floating on a surface of water; and an oil filtration membrane connected to the floating member, allowing the water to pass therethrough, and rapidly collecting materials such as oil or a hazardous and noxious substance included in the water.

3 Claims, 13 Drawing Sheets

OIL FENCE WITH OIL FILTRATION MEMBRANE

CROSS-REFERENCE TO RELATED APPLICATION

This application claims the benefit of Korean Patent Application No. 10-2016-0181524, filed on Dec. 28, 2016, in the Korean Intellectual Property Office, the disclosure of which is incorporated herein in its entirety by reference.

BACKGROUND

1. Field

One or more embodiments relate to an oil fence including an oil filtration membrane, and more particularly, to an oil fence including an oil filtration membrane that allows water to pass therethrough and rapidly and reliably collects oil or hazardous and noxious substances in the water.

2. Description of the Related Art

When an oil spill accident occurs in the sea or on a river, oil or a hazardous and noxious substance (HNS) floats and is rapidly dispersed on the surface of the sea or the river, thereby causing serious contamination of the environment. Thus, when an oil or HNS spill occurs, it is important to quickly remove the spilled oil or HNS.

When the oil spill occurs, a method of spraying an emulsifying agent on a surface of water, on which the oil floats, and sinking the oil toward the bottom of the sea or river, a method of eliminating the oil on the seashore by using an adsorption bag after contaminating materials are dispersed along the seashore, etc. are used, in general. However, the emulsifying agent has a problem of causing secondary contamination, since it sinks the oil toward the sea or river bed, and the oil elimination by using the adsorption bag may be implemented only after the contaminating materials have been abundantly spread. Thus, a technology is required, which may effectively block and withdraw oil dispersion right after the oil leakage.

An oil fence described in Korean Patent Registration No. 1149032 includes a curtain for blocking oil and preventing the flow of the oil. This oil fence may operate to block water as well as oil, and thus, when strong tidal currents occur, the oil is swept away due to a high flow rate.

FIG. 1 is a perspective view showing an operational state of a conventional oil fence.

The oil fence illustrated in FIG. 1 includes a floating member 701 and an enveloping membrane 702 for locking up a liquid. The enveloping membrane 702 may not allow materials included in the liquid as well as the liquid to pass therethrough and may lock up the materials included in the liquid and the liquid, thereby preventing distribution of the materials, such as oil. However, the oil fence having this structure may be used only for the purpose of temporarily enveloping oil and preventing the distribution of the oil, and may not be used for rapidly and continually collecting and withdrawing the oil.

In addition, according to this oil fence, since the liquid does not pass through the enveloping membrane 702, water pressure due to the liquid is applied to a surface of the enveloping membrane 702. Thus, when a ship pulls on the fence or when the waves are strong, the contaminated liquid including materials may bump into the enveloping membrane 702 and then be swept away through a bottom end of the enveloping membrane 702 as illustrated in FIG. 1, or the enveloping membrane 702 may be overturned due to strong pressure of the waves.

FIG. 2 is a perspective view showing another operational state of the conventional oil fence.

When water, which perpendicularly bumps into the enveloping membrane 702, has a high flow rate, a film of oil on a surface of the water passes over into the floating member 701 of the oil fence, along with the water, as illustrated in FIG. 2, and thus, the oil, the dispersion of which was prevented via the oil fence, is carried away.

FIG. 3 is a perspective view showing another operational state of the conventional oil fence.

When the water pressurizes the enveloping membrane 702 of the oil fence in a direction that is opposite to a direction in which wind above a surface of the water affects the floating member 701, the oil fence is overturned as illustrated in FIG. 3 and thus, the oil fence may not perform a function of preventing the diffusion of oil.

PRIOR ART DOCUMENT

Patent Document (Patent document 1) Korean Patent Registration No. 1149032 (published on May 16, 2012)

SUMMARY

One or more embodiments include an oil fence including an oil filtration membrane allowing water to pass therethrough, the oil fence rapidly collecting oil or a hazardous and noxious substance (HNS).

One or more embodiments include an oil fence including an oil filtration membrane allowing water to pass therethrough, the oil fence minimizing a phenomenon in which the oil fence is damaged or overturned, when strong tidal currents occur, or a phenomenon in which the oil fence is damaged or overturned due to pressure of the water, when a ship drives at a high speed and pulls the oil fence.

One or more embodiments include an oil fence including an oil filtration membrane allowing water to pass therethrough, the oil fence collecting oil or an HNS and directly discharging highly purified water.

Additional aspects will be set forth in part in the description which follows and, in part, will be apparent from the description, or may be learned by practice of the presented embodiments.

According to one or more embodiments, an oil fence including an oil filtration membrane includes: a floating member floating on a surface of water; and an oil filtration membrane connected to the floating member, allowing the water to pass therethrough, and collecting materials included in the water.

The oil filtration membrane may include a porous material surface-processed to have a hydrophilic property.

The oil filtration membrane may include pores having a size of dozens of micrometers.

The oil filtration membrane may include a core of about 10 to about 500 meshes, a porous layer arranged on a surface of the core, a plurality of nano-protuberance structures arranged on a surface of the porous layer and including a polymer material, wherein the plurality of nano-protuberance structures have a diameter of about 1 to about 100 nm, a length of about 1 to about 10,000 nm, and an aspect ratio of about 1 to about 50, and an inorganic particle arranged at an end of at least one of the plurality of nano-protuberance structures.

The porous layer may include a hydrophilic polymer, the core may include a metal, a plastic, or a combination thereof, and the inorganic particle may include at least one of Ti, Cu, Au, Ag, Cr, Pt, Fe, Al, Si, an alloy thereof, and an oxide thereof.

The oil fence may further include a frame configured to support at least one of edges of the oil filtration membrane and block both the water and the materials included in the water.

The frame may be configured to support at least three of the edges of the oil filtration membrane.

The frame may include, at an edge thereof, a floating member supporter coupled to the floating member.

The oil fence may further include a weight coupled to the frame, wherein the frame includes, at an edge thereof, a weight supporter coupled to the weight.

The oil fence may further include a plurality of collecting units including the oil filtration membrane and sequentially connected to one another, wherein each of the plurality of collecting units includes a frame configured to support the oil filtration membrane.

The oil fence may further include a link connecting an adjacent pair of the plurality of collecting units to be rotatable with respect to each other, wherein the adjacent pair of the plurality of collecting units rotate so as to become close to each other so that the collecting units are folded, or the adjacent pair of the plurality of collecting units rotate so as to be distanced from each other so that the collecting units are unfolded.

The frame may include a first frame including a plurality of first penetration holes and contacting a surface of the oil filtration membrane, and a second frame including a plurality of second penetration holes and contacting another surface of the oil filtration membrane.

The first frame may include, at an edge thereof, a floating member supporter coupled to the floating member.

The oil fence may further include a weight coupled to the frame, wherein the first frame further includes, at another edge thereof, a weight supporter coupled to the weight.

The plurality of nano-protuberance structures may have a form of nano-hairs, nano-fibers, nano-pillars, nano-rods, or nano-wires.

The porous layer may be arranged on the surface of the core, with an adhesion layer interposed between the porous layer and the surface of the core.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept now will be described more fully hereinafter with reference to the accompanying drawings, in which elements of the invention are shown. The inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items. Expressions such as "at least one of," when preceding a list of elements, modify the entire list of elements and do not modify the individual elements of the list.

Figure 1:
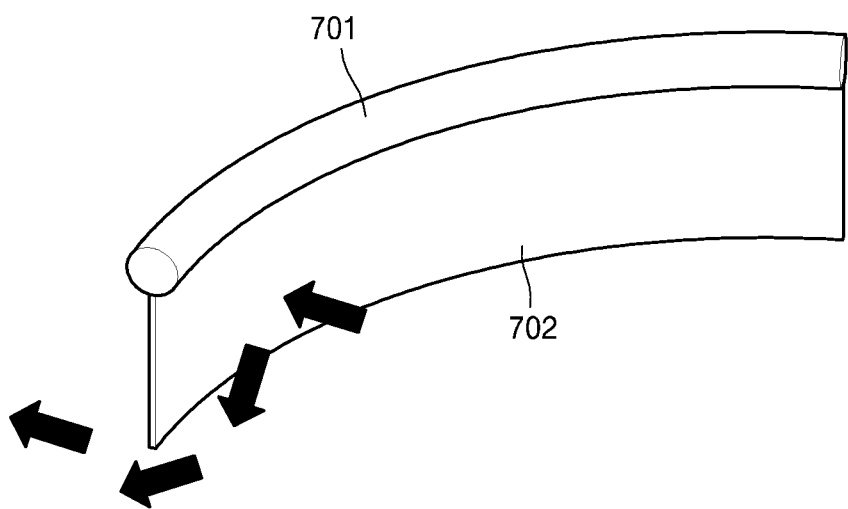
FIG. 1 is a perspective view showing an operational state of a conventional oil fence.
Figure 2:
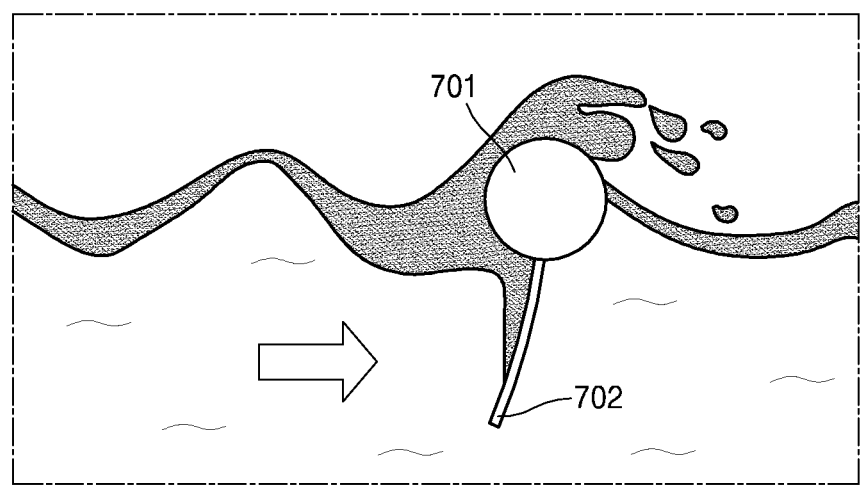
FIG. 2 is a perspective view showing another operational state of the conventional oil fence.
Figure 3:
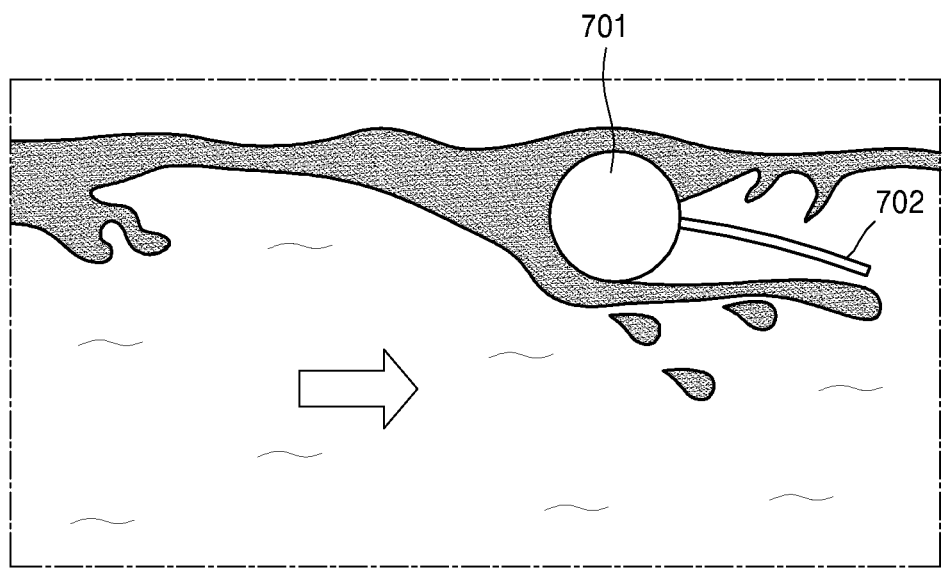
FIG. 3 is a perspective view showing another operational state of the conventional oil fence.
Figure 4:
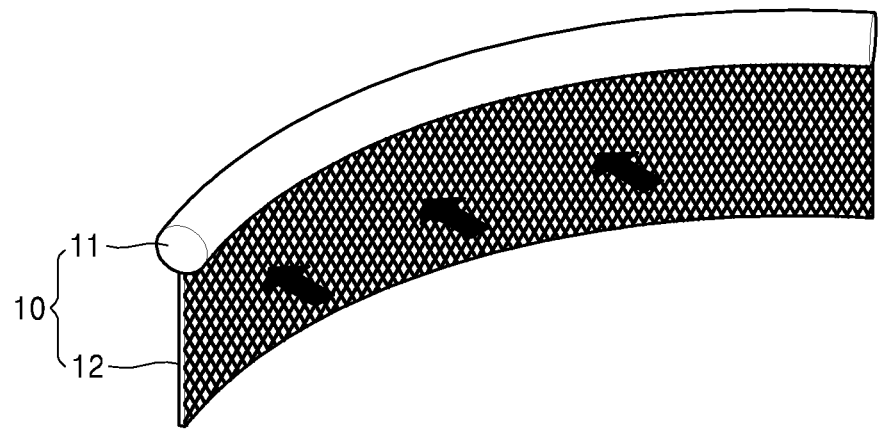
FIG. 4 is a perspective view showing an operational state of an oil fence including an oil filtration membrane, according to an embodiment.

FIG. 4 is a perspective view for showing an operational state of an oil fence 10 including an oil filtration membrane 12, according to an embodiment.

The oil fence 10 including the oil filtration membrane 12 according to the embodiment illustrated in FIG. 4 may include a floating member 11 floating on a surface of water of the sea or a river, and the oil filtration membrane 12 which is connected to the floating member 11, through which water passes, and which collects materials (floating materials) included in the water.

The floating member 11 may be manufactured by using a material, such as polystyrene, to have sufficient buoyancy, or may be manufactured in a form of a tube charged with air.

Figure 5:
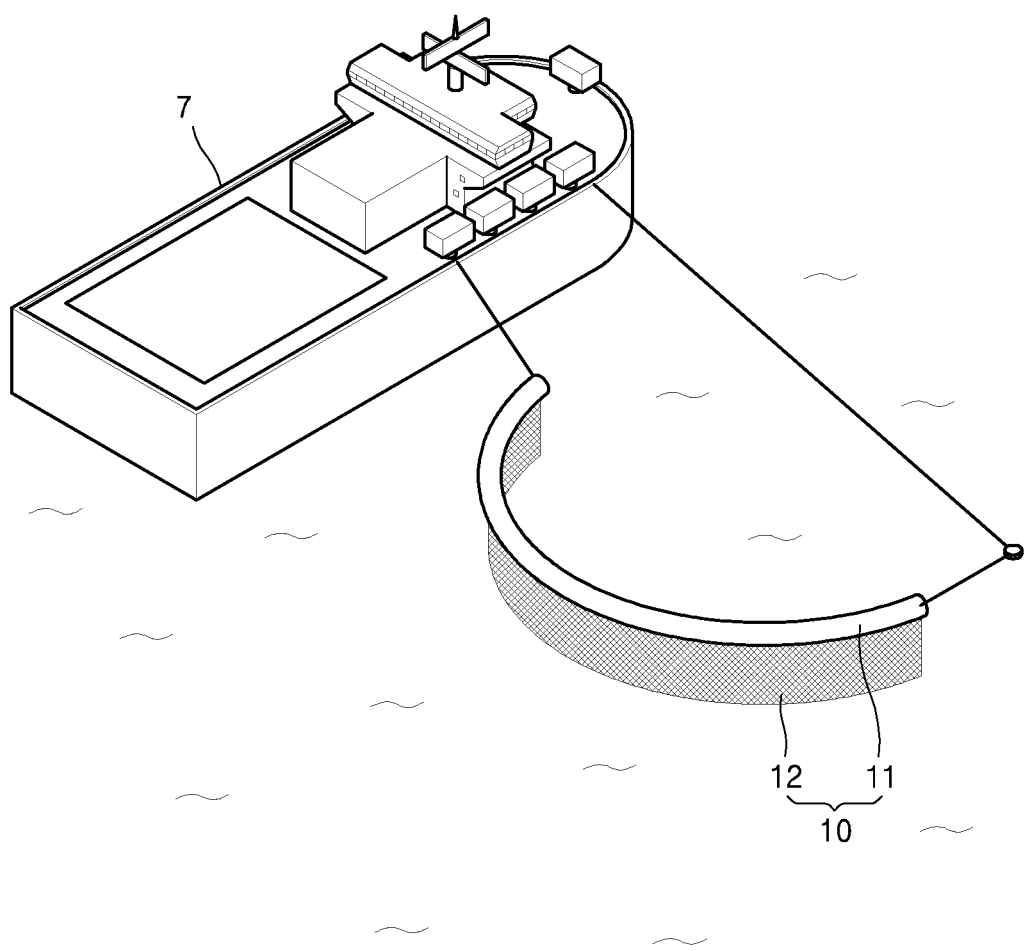
FIG. 5 is a view showing an example in which the oil fence including the oil filtration membrane illustrated in FIG. 4 is used.

FIG. 5 is a view showing an example in which the oil fence 10 including the oil filtration membrane 12 according to FIG. 4 is used.

As illustrated in FIG. 5, the floating member 11 of the oil fence 10 is connected to a ship 7, and thus, when the ship 7, to which the oil fence 7 is connected, advances, the ship 7 may pull the oil fence 10 so that the oil filtration membrane 12 of the oil fence 10 may collect materials floating on a surface of water.

Figure 6:
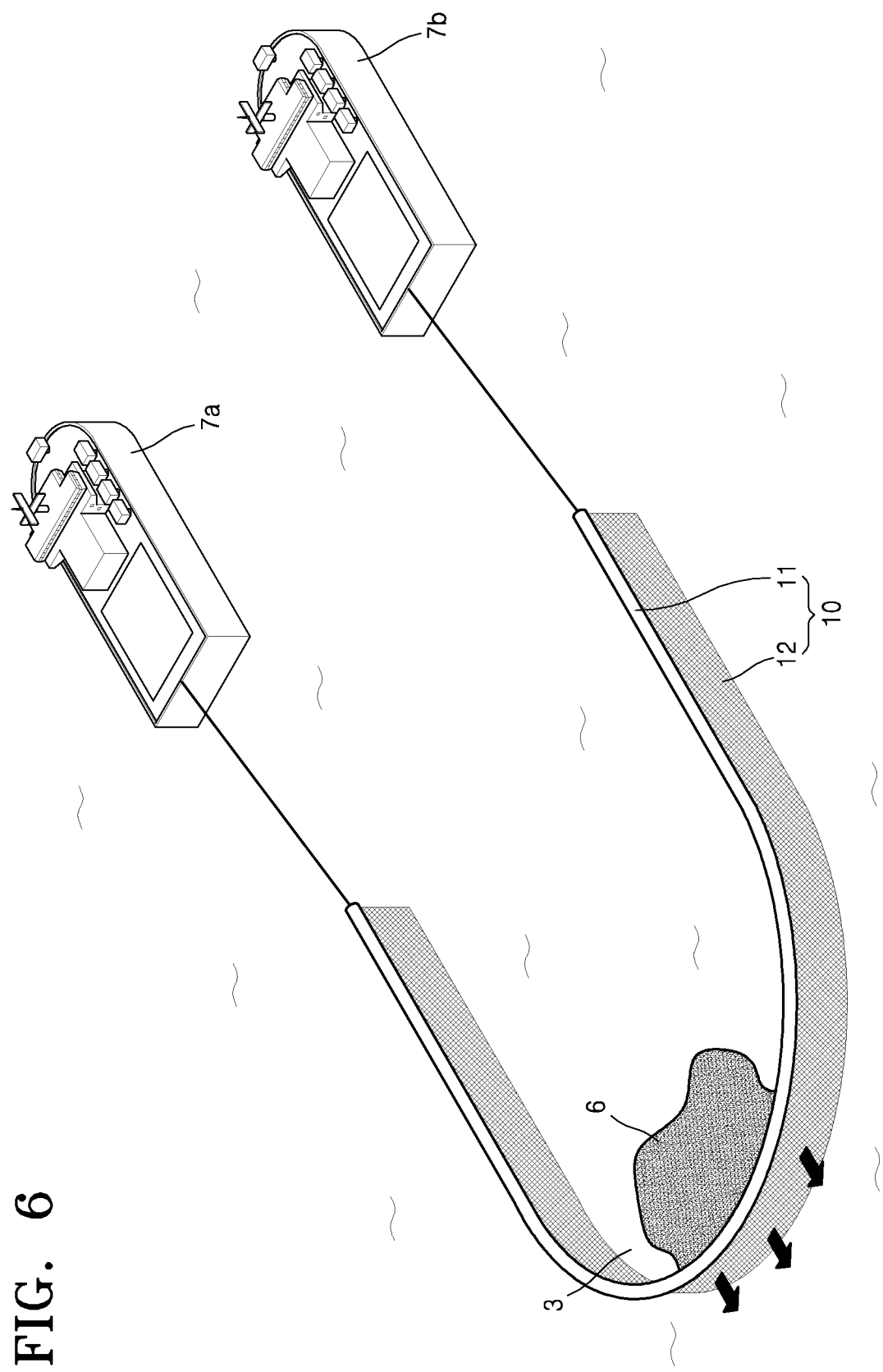
FIG. 6 is a view showing another example in which the oil fence including the oil filtration membrane illustrated in FIG. 4 is used.

FIG. 6 is a view showing another example in which the oil fence 10 including the oil filtration membrane 12 according to FIG. 4 is used.

As illustrated in FIG. 6, two ships 7a and 7b may be connected to the oil fence 10. When the two ships 7a and 7b pull the oil fence 10, the oil fence 10 may collect materials floating on a wider range of the surface of the water, than when one ship pulls the oil fence 10.

The oil filtration membrane 12 of the oil fence 10 may allow only water 3 to pass therethrough and may collect materials included in the water 3. The oil filtration membrane 12 may collect a material 6, such as oil or a hazardous and noxious substance (HNS), included in the water 3. The oil filtration membrane 12 may be formed as a hydrophilic porous mesh, and may include a plurality of nano-protuberance structures 12n (refer to FIG. 8) on a surface thereof to quickly collect the oil or HNS.

Figure 7:
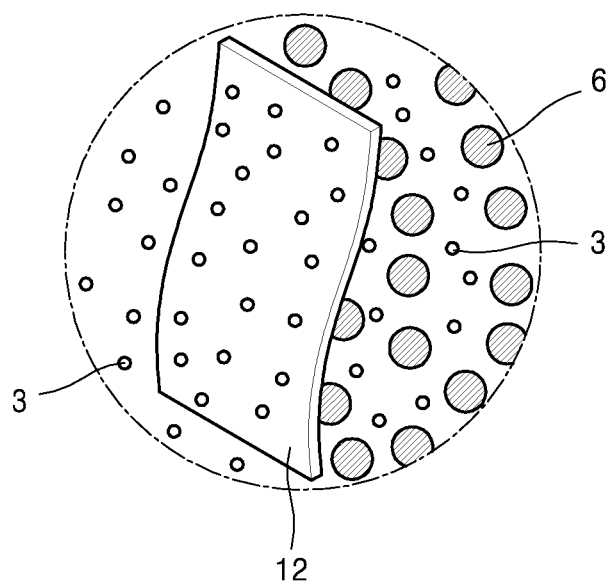
FIG. 7 is a view for describing a state in which the oil fence including the oil filtration membrane illustrated in FIG. 4 collects floating materials.

FIG. 7 is a view for describing a state in which the oil fence 10 including the oil filtration membrane 12 of FIG. 4 collects a floating material.

Referring to FIGS. 6 and 7, while the ships 7a and 7b pull the oil fence 10, the water 3 including the material 6 may pass through the oil filtration membrane 12 of the oil fence 10, and thus, only the material 6 included in the water 3 may be collected by the oil filtration membrane 12 and the purified water 3 may pass through the oil filtration membrane 12.

The oil filtration membrane 12 has a hydrophilic property and at the same time has a property for collecting the material 6, such as oil, and thus, when the ships 7a and 7b pull the oil fence 10, the water 3 may easily pass through the oil filtration membrane 12 so that a pressure applied to a surface of the oil fence 10 via the water 3 may be minimized.

The oil filtration membrane 12 may be manufactured as a porous mesh surface-processed to be hydrophilic. The oil filtration membrane 12 may be manufactured to be hydrophilic by including pores having a size of micrometers. Also, the nano-protuberance structures 12n (refer to FIG. 8) including a polymer material may be provided on a surface of the oil filtration membrane 12.

The oil filtration membrane 12 having this structure may allow water to pass therethrough and filter and collect materials, such as water or HNSs, included in the water. In particular, since a concentration of the oil included in the water having passed through the oil filtration membrane 12 meets a required criterion for an oil-water separator, which is equal to or lower than 15 ppm, the water having passed through the oil filtration membrane 12 may be discharged again to the sea.

According to the oil fence 10 described above, the material 6 may be quickly collected. Since the oil filtration membrane 12 of the oil fence 10 allows the water to pass therethrough, while collecting the material 6, water pressure applied to the oil fence 10 may be minimized. Thus, a phenomenon in which the oil fence 10 is overturned when a ship sails at a high speed or when strong tidal currents occur may be minimized. Also, a phenomenon in which the oil passes over the oil fence 10 and is carried away may be minimized.

Figure 8:
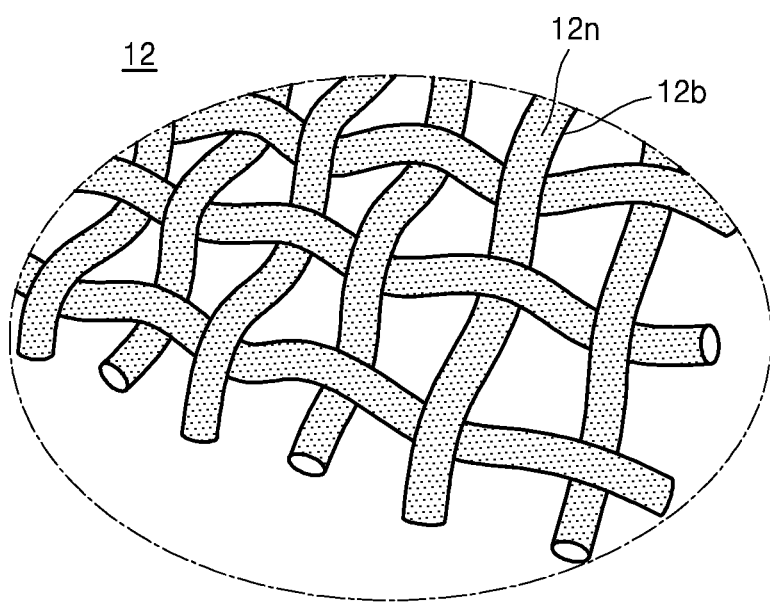
FIG. 8 is a perspective view of a structure of a portion of the oil fence including the oil filtration membrane illustrated in FIG. 4.

FIG. 8 is a perspective view of a structure of a portion of the oil fence 10 including the oil filtration membrane 12 according to FIG. 4.

The oil filtration membrane 12 illustrated in FIG. 8 may be manufactured as a porous mesh 12b including pores having a size of dozens of micrometers. The mesh 12b may include the plurality of nano-protuberance structures 12n including a polymer material and may be surface-processed to be hydrophilic.

The oil filtration membrane 12 may be formed as the mesh 12b having mesh holes through which water may pass. Embodiments are not limited to shapes of the mesh holes of the mesh 12b or methods of manufacturing the mesh 12b.

The oil filtration membrane 12 may be formed, for example, as 10 to 500 meshes. When such numbers of meshes are included as the oil filtration membrane 12, water may pass through the oil filtration membrane 12 and only oil may be filtered. When the oil filtration membrane 12 includes more than 500 meshes, sizes of the mesh holes may become too small so that a speed at which the water passes through the oil filtration membrane 12 may significantly decrease, which may degrade the de-oiling efficiency, and when the oil filtration membrane 12 includes less than 10 meshes, sizes of the meshes may become too large so that there is a possibility that the oil may also pass through the oil filtration membrane 12.

Figure 9A:
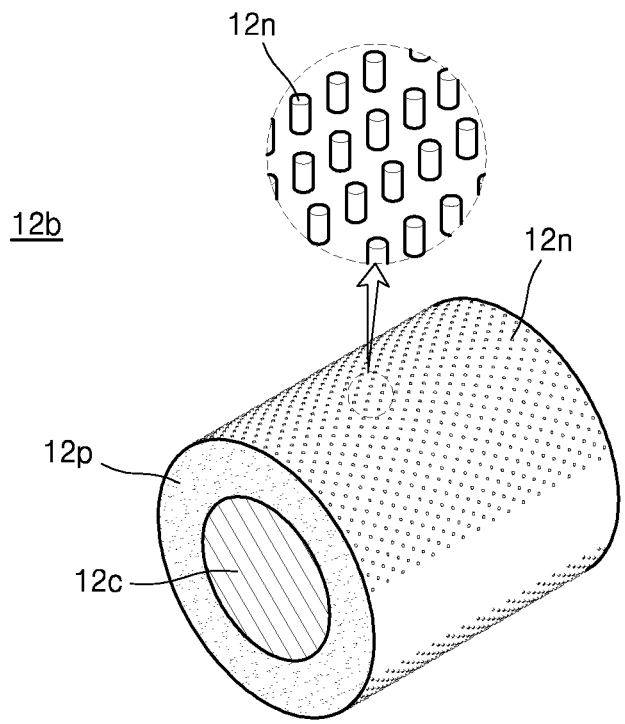
FIG. 9A is a perspective view of a section of the oil filtration membrane of the oil fence illustrated in FIG. 8 and an enlarged view of a nano-protuberance structure on a surface thereof.

FIG. 9A is a perspective view of a section of a portion of the oil filtration membrane 12 of the oil fence 10 of FIG. 8.

The mesh 12b may include a core 12c having a mesh shape and including a metal or a hard plastic, a porous layer 12p arranged on a surface of the core 12c, and the plurality of nano-protuberance structures 12n arranged on a surface of the porous layer 12p. The porous layer 12p may be formed to include pores having a size of dozens of micrometers so as to be hydrophilic. The nano-protuberance structures 12n may have a diameter of 1 to 100 nanometers.

The core 12c may include a metal, a plastic, or a combination thereof, so as to have a predetermined rigidity.

The metal included in the core 12 may include Fe, Al, stainless steel, Cu, Pt, Au, Ag, Ti, Si, or an alloy thereof, or a combination thereof.

The plastic included in the core 12c is not particularly limited. For example, the plastic included in the core 12c may include at least one of polypropylene, polyethylene terephthalate, polyvinylidene fluoride, polytetrafluoroethylene, a copolymer thereof, and a combination thereof.

The porous layer 12p coated on the surface of the core 12c may be formed by forming the core 12c in the mesh shape and coating the surface of the core 12c with a polymer coating layer by dipping the core 12c having the mesh shape in a polymer coating solution.

The porous layer 12p may include a polymer which is highly rigid and hydrophilic. The polymer may include, for example, at least one of poly(N-isopropylacrylamide) (PNI-PAm), poly(2-hydroxyethyl methacrylate (PHEMA), polysilsesquinoxane (PSQ), polyurethane (PU), poly (ethylene glycol) (PEG), polyetherimide (PEI), poly (methylmethacrylate) (PMMA), and polyvinylalcohol (PVA).

The porous layer 12p may be coated on the core 12c such that the mesh hole of the core 12c is not filled. When the mesh hole is blocked, there may be an insufficient space, through which water may pass, so that water pressure applied to the oil filtration membrane 12 may increase and the de-oiling function may be deteriorated.

As shown in Table 1, the hydrophilic polymers described above have high surface energy and low contact angles, so that the porous layer 12p having a maximized hydrophilic property may be formed.

TABLE 1

| Polymer | Surface Energy (mJ/m$^2$) | Contact Angle (°) |
| --- | --- | --- |
| PNIPAm | 38.9 | 75 |
| PHEMA | 57.6 | 59 |
| PU | 37.5 | 77.5 |
| PEG | 41.3 | 45 |
| PEI | 59.5 | 68 |
| PMMA | 41.1 | 68-72 |
| PVA | 38.5 | 60.6 |

Figure 9B:
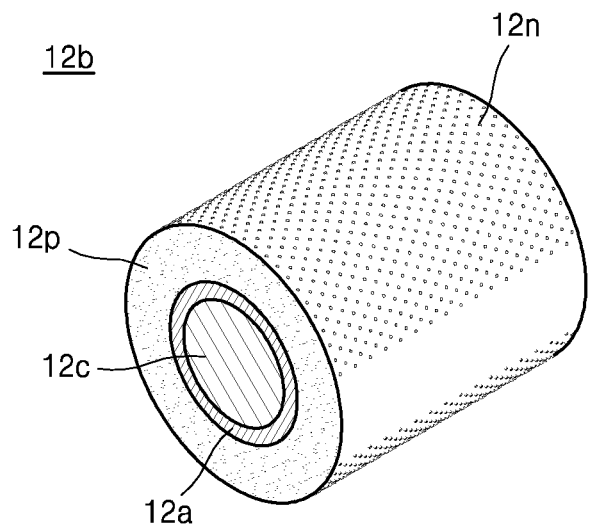
FIG. 9B is a perspective view of a section of another example of the oil filtration membrane illustrated in FIG. 9A.

FIG. 9B is a perspective view of a section of another example of the oil filtration membrane 12 of FIG. 9A.

The mesh 12b of the oil filtration membrane 12 may include the core 12c including, for example, a metal or a hard plastic, the porous layer 12p arranged on the surface of the core 12c with an adhesion layer 12a interposed between the porous layer 12p and the surface of the core 12c, and the plurality of nano-protuberance structures 12n arranged on the surface of the porous layer 12p. The porous layer 12p may be formed to have pores having sizes of dozens of micrometers so as to be hydrophilic.

Figure 9C:
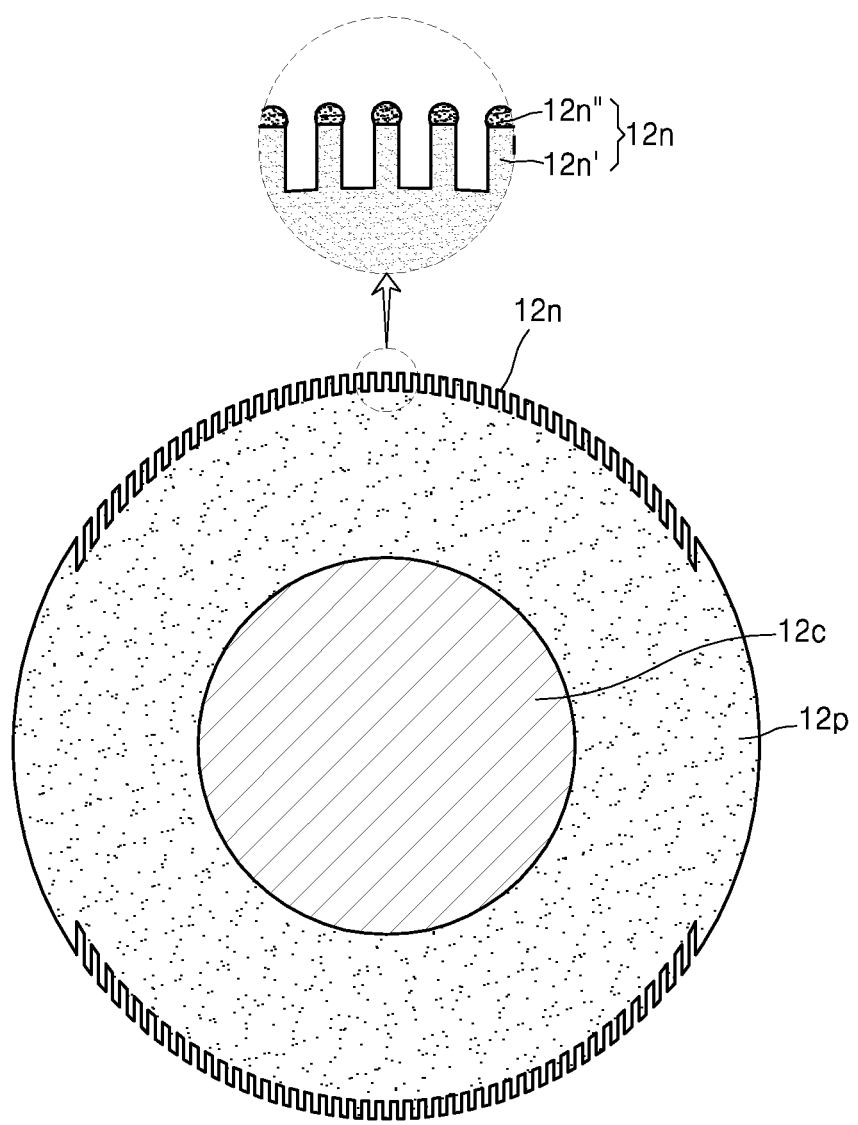
FIG. 9C is a cross-sectional view of the oil filtration membrane illustrated in FIG. 9A and an enlarged view of a nano-protuberance structure on a surface thereof.

FIG. 9C is an enlarged view of the plurality of nano-protuberance structures 12n on a surface of the oil filtration membrane 12 of FIG. 9A.

As illustrated in FIG. 9C, the nano-protuberance structures 12n may include a plurality of protrusion units 12n' arranged at the same interval between each other and having a nano-size, and inorganic particles 12n'' arranged at ends of the protrusion units 12n'.

The nano-protuberance structures 12n may be formed by performing, in a perpendicular direction, plasma-processing on the core 12c coated with the porous layer 12p, and thus, the nano-protruberance structures 12n may be formed on an upper surface and/or a lower surface of the porous layer 12p. Also, the protrusion units 12n' may be arranged in a direction perpendicular to a direction horizontally crossing a center of the core 12c in FIG. 9C, irrespective of a curvature of the surface of the porous layer 12p.

Each of the protrusion units 12n' may have a diameter of 1 to 100 nm, a length of 1 to 10,000 nm, and an aspect ratio of 1 to 50. The protrusion units 12n' may be included in the nano-protuberance structures 12n on the surface of the porous layer 12p, by having a form, such as nano-hairs, nano-fibers, nano-pillars, nano-rods, or nano-wires.

The inorganic particles 12n'' may be arranged on at least portions of the ends of the protrusion units 12n'. Each of the inorganic particles 12n'' may include a plurality of inorganic particles forming a cluster. In addition, although the inorganic particles 12n'' may be arranged at the ends of almost all or all the protrusion units 12n', some of the inorganic particles 12n'' may be etched away in an etching process via the plasma-process, and thus, not all of the ends of the protrusion units 12n' may have the inorganic particles 12n''.

The inorganic particles 12n'' may include a metal or a metal oxide capable of generating a surface property which is appropriate for a de-oiling purpose.

The inorganic particles 12n'' may include a metal or a metal oxide generating a hydrophilic or ultra-hydrophilic property for allowing water to pass therethrough and not allowing oil to pass therethrough. The metal or the metal oxide may be derived from a metal mesh structure. For example, the inorganic particles 12n'' may include at least one of Ti, Cu, Au, Ag, Cr, Pt, Fe, Al, Si, an alloy thereof, and an oxide thereof.

For example, when the inorganic particles 12n'' including $TiO_2$ are arranged at the ends of the protrusion units 12n' included in the nano-protuberance structures 12n, the nano-protuberance structures 12n, which may have a hydrophilic surface property, may have an even improved hydrophilic surface property.

The nano-protuberance structures 12n may have an ultra-hydrophilic surface property whereby a contact angle with respect to water is equal to or less than 20 degrees, due to a chemical combination with the inorganic particles 12n'' giving a hydrophilic property to a surface of a substrate on which the nano-protuberance structures 12n are formed.

The oil filtration membrane 12 having such an ultra-hydrophilic surface has a very high surface energy, and thus, may have an oleophilic property with respect to oil having a low surface energy. However, in the water, oil is not absorbed into the oil filtration membrane 12 and the oil filtration membrane 12 has superoleophobicity whereby the oil maintains a sphere bubble shape. Accordingly, in the water, the nano-protuberance structures 12n may have a great contact angle with respect to oil in the water. Here, the contact angle may be, for example, equal to or higher than 140 degrees.

Figure 10:
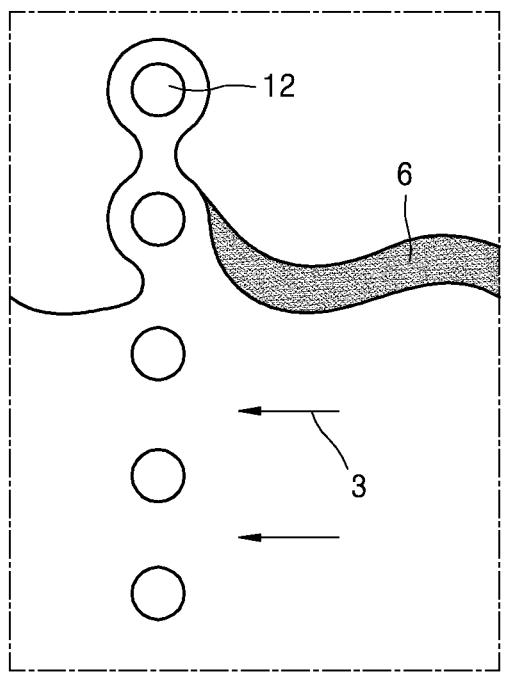
FIG. 10 is a cross-sectional view of the oil fence including the oil filtration membrane illustrated in FIG. 4, the view showing an operational state of the oil fence.

FIG. 10 is a cross-sectional view of the oil fence 10 including the oil filtration membrane 12 illustrated in FIG. 4, the view showing an operational state of the oil fence 10.

The oil filtration membrane 12 may have high wettability with respect to the water 3 and thus, the water 3 may easily pass through the oil filtration membrane 12. That is, when a liquid in which the material 6, such as oil, and the water 3 are mixed, tries to pass through the oil filtration membrane 12, the water 3 may easily pass through the oil filtration membrane 12, while the material 6 may not pass through the oil filtration membrane 12 due to a repulsive force with respect to the water 3 and may be filtered and collected by the oil filtration membrane 12.

Figure 11:
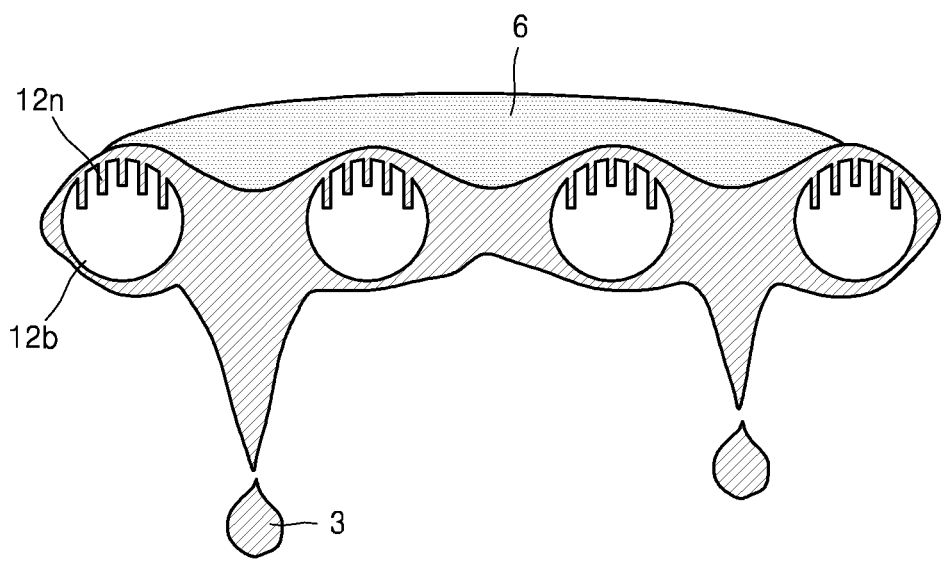
FIG. 11 is a cross-sectional view of a portion of an oil fence including an oil filtration membrane according to another embodiment.

FIG. 11 is a cross-sectional view of a portion of an oil fence including an oil filtration membrane according to another embodiment The oil filtration membrane of the oil fence according to the embodiment illustrated in FIG. 11 may include the nano-protuberance structures 12n formed to have a shape of recesses on a surface of the mesh 12b including a porous material.

The mesh 12b may have an ultra-hydrophilic property due to the nano-protuberance structures 12n, and thus, when the water 3, and the material 6, such as oil, contact the mesh 12b, the water 3 strongly adheres to the mesh 12b because the water 3 contacts the hydrophilic porous surface of the mesh 12b. Accordingly, a water screen is formed on the surface of the mesh 12b.

The material 6 may not pass through pores of the mesh 12b, due to repulsion of the water screen on the surface of the mesh 12b, and thus, the material 6 may be collected by the mesh 12b.

Figure 12:
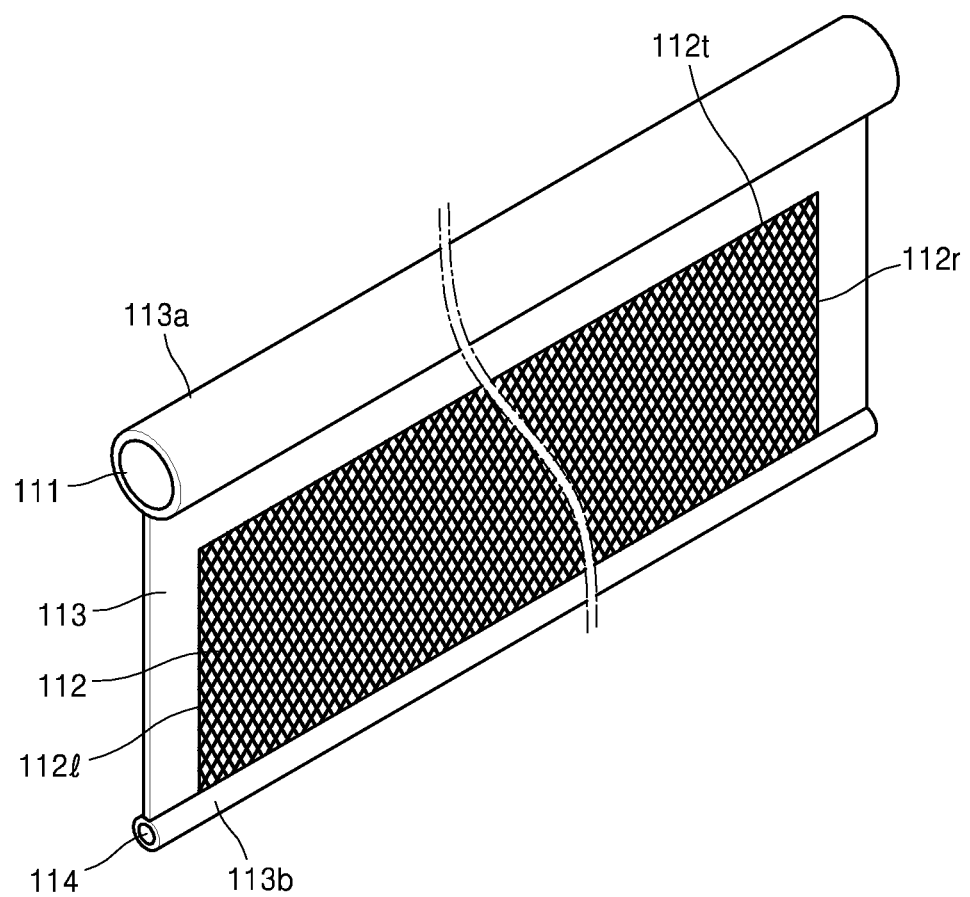
FIG. 12 is a perspective view of an oil fence including an oil filtration membrane according to another embodiment.

FIG. 12 is a perspective view of an oil fence including an oil filtration membrane according to another embodiment.

The oil fence according to the embodiment illustrated in FIG. 12 may include a floating member 111, an oil filtration membrane 112, and a frame 113 supporting the oil filtration membrane 112 and the floating member 111. The frame 113 may include a membrane including a fabric material or a non-transmissive resin material, and thus, may block both water and a material.

The frame 113 may support at least three edges 112l, 1112, and 112r of the oil filtration membrane 112. Also, the frame 113 may include, at an upper edge thereof a floating member supporter 113a accommodating the floating member 111, and supporting the floating member 111. Also, the frame 113 may include, at a lower edge thereof, a weight supporter 113b accommodating a weight 114 and supporting the weight 114. The floating member 111 and the weight 114 may have a shape of a rod, such as a cylindrical rod. The floating member supporter 113a and the weight supporter 113b may have a hollow tube shape, such as a hollow cylindrical tube shape, in order to accommodate the floating member 111 and the weight 114.

The weight 114 may be formed to be heavy by including a material, such as a metal, a powder, a rigid plastic, etc., and while the oil fence is used, the weight 114 gives the frame 113 and the oil filtration membrane 112 a force along a direction in which gravity is applied, thereby assisting the frame 113 and the oil filtration membrane 112 in not being deformed due to water pressure and maintaining their positions.

Figure 13:
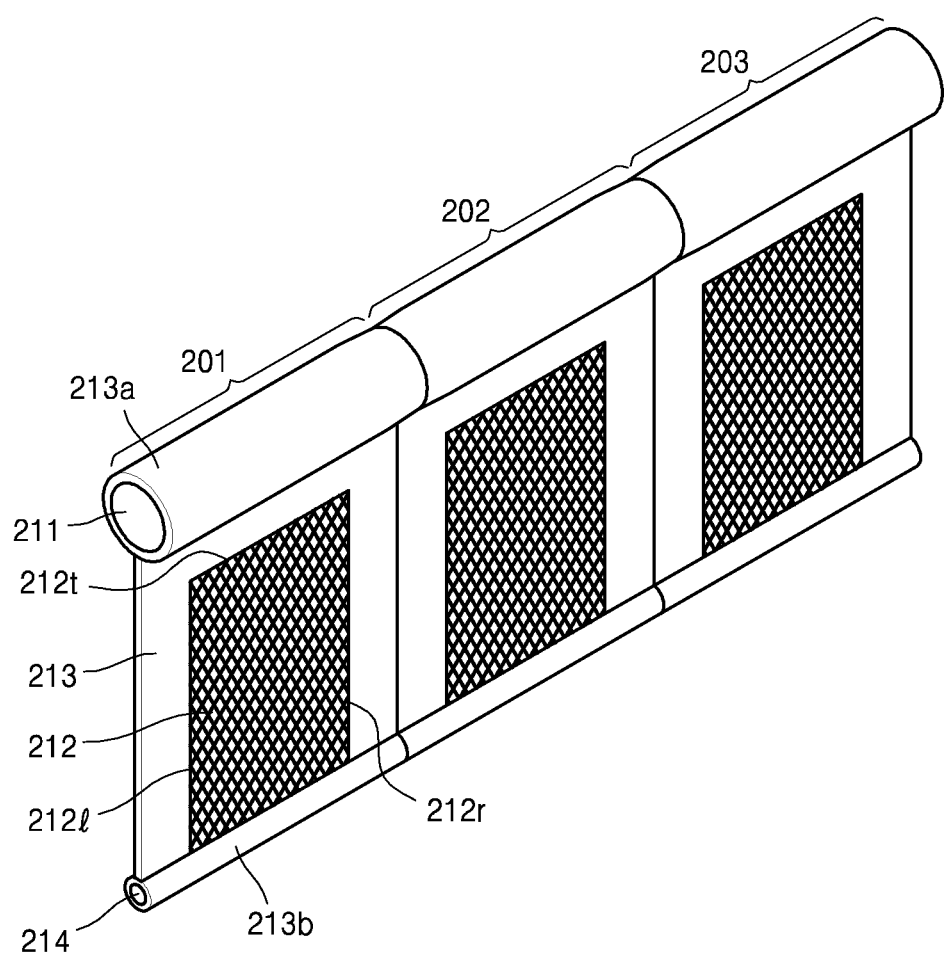
FIG. 13 is a perspective view of an oil fence including an oil filtration membrane according to another embodiment.

FIG. 13 is a perspective view of an oil fence including an oil filtration membrane according to another embodiment.

The oil fence according to the embodiment illustrated in FIG. 13 may include a plurality of collecting units 201, 202, and 203 sequentially connected to each other. FIG. 13 illustrates the three collecting units 201, 202, and 203. However, the number of collecting units 201, 202, and 203 may be increased or decreased according to a required total length of the oil fence.

Each of the collecting units 201, 202, and 203 may be formed to have the same structure, and the collecting units 201, 202, and 203 may be connected to each other by coupling adjacent edges of the adjacent collecting units 201, 202, and 203 to each other via a coupling member.

Each of the collecting units 201, 202, and 203 may include an oil filtration membrane 212 and a frame 213 supporting the oil filtration membrane 212. The frame 213 may include a membrane including a fabric material or a non-transmissive resin material, and thus, may block both water and a material.

The frame 213 may support at least three edges 212l, 212r, and 212t of the oil filtration membrane 212. Also, the frame 213 may include, at an upper edge thereof, a floating member supporter 213a accommodating a floating member 211 and supporting the floating member 211. Also, the frame 213 may include, at a lower edge thereof, a weight supporter 213b accommodating a weight 214 and supporting the weight 214.

As described above, since the oil fence has the structure in which the plurality of collecting units 201, 202, and 203 are sequentially connected to each other, a length of the oil fence may be freely and variously adjusted. Also, when some of the collecting units 201, 202, and 203 are damaged, only the damaged collecting units 201, 202, and 203 may be replaced. Thus, the maintenance and management of the oil fence becomes convenient.

Figure 14:
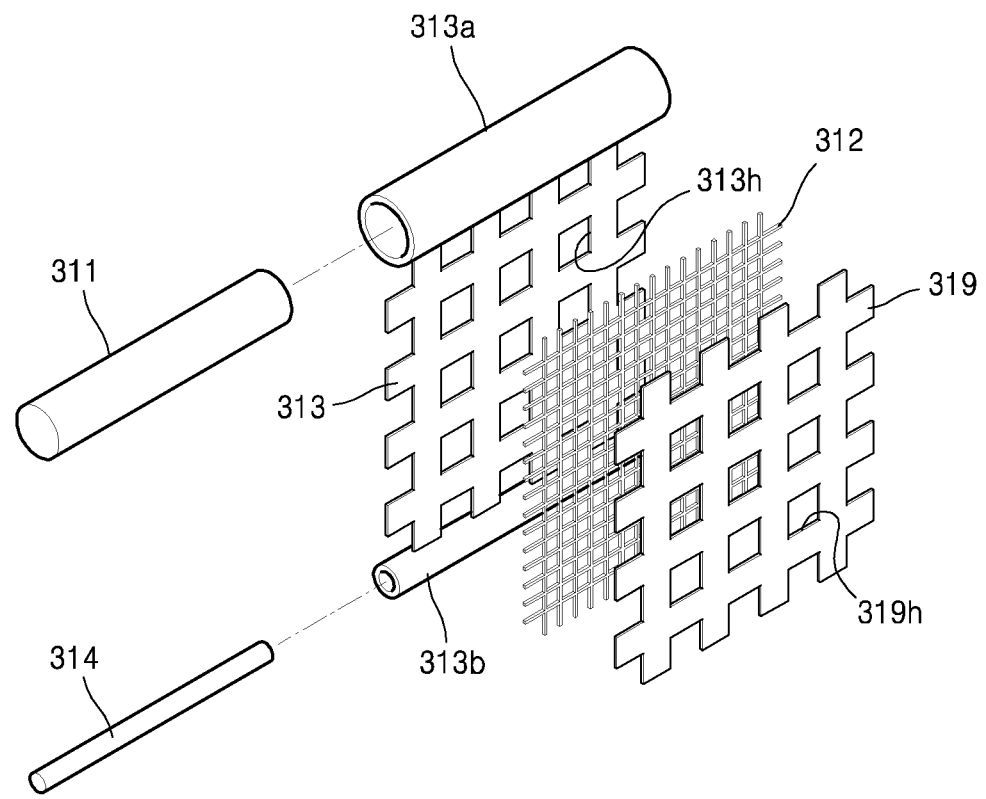
FIG. 14 is an exploded perspective view schematically showing a coupling relationship of components of an oil fence including an oil filtration membrane, according to another embodiment.

FIG. 14 is an exploded perspective view schematically showing a coupling relationship of components of an oil fence including an oil filtration membrane, according to another embodiment.

A structure of the oil fence illustrated in FIG. 14 may be applied to the overall structure of the oil fence illustrated in FIG. 12 or the structure illustrated in FIG. 13 may be applied to each of the plurality of collecting units 201, 202, and 203.

The oil fence according to the embodiment illustrated in FIG. 14 may include an oil filtration membrane 312 and frames 313 and 319 supporting the oil filtration membrane 312. The frames 313 and 319 may include the first frame 313 having a plurality of first penetrating holes 313h and contacting a surface of the oil filtration membrane 312, and the second frame 319 having a plurality of second penetrating holes 319h and contacting the other surface of the oil filtration membrane 312.

The first frame 313 and the second frame 319 may include a membrane including a fabric material or a non-transmissive resin material, and thus, may block both water and a material.

The first penetrating holes 313h of the first frame 313 and the second penetrating holes 319h of the second frame 319 may allow the water to contact and pass through the oil filtration membrane 312. That is, the oil filtration membrane 312 exposed through the first penetrating holes 313h and the second penetrating holes 319h may contact and allow the water to pass through the oil filtration membrane 312, to thus filter and collect materials included in the water.

The first frame 313 may include, at an upper edge thereof, a floating member supporter 313 accommodating and supporting a floating member 311. Also, the first frame 313 may include, at a lower edge thereof, a weight supporter 113b accommodating and supporting a weight 314.

According to the structure of the oil fence described above, since the both surfaces of the oil filtration membrane 312 may be supported by the first frame 313 and the second frame 319, the overall rigidity of the oil fence may be improved and the oil filtration membrane 312 may be protected.

Figure 15:
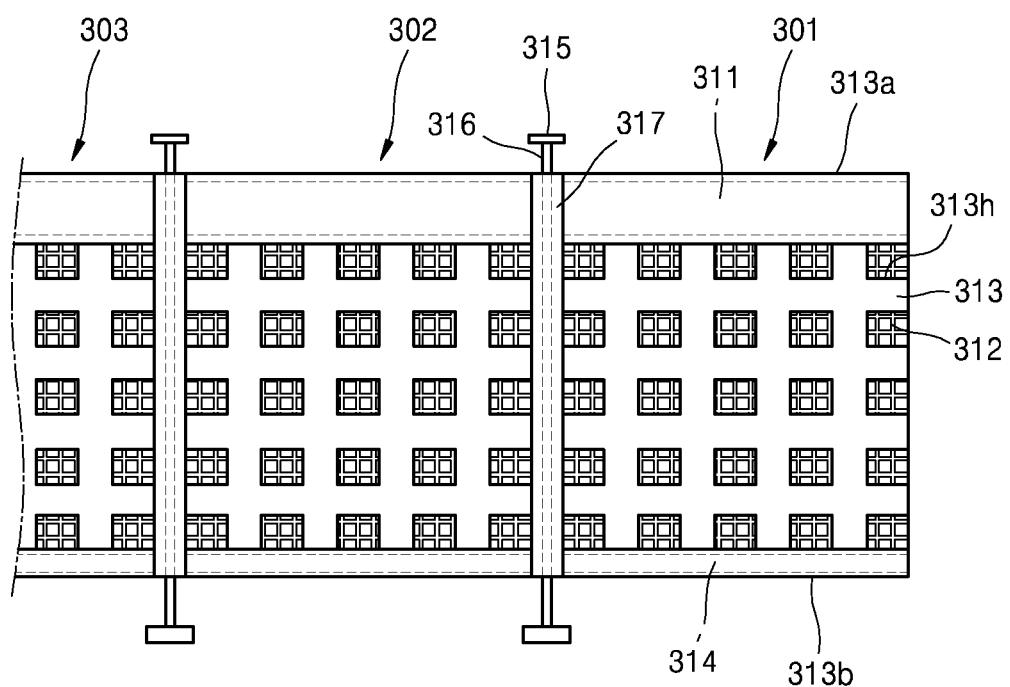
FIG. 15 is a front view of a portion of an oil fence including an oil filtration membrane according to another embodiment.

FIG. 15 is a front view of a portion of an oil fence including an oil filtration membrane according to another embodiment.

The oil fence according to the embodiment illustrated in FIG. 15 may include a plurality of collecting units 301, 302, and 303 sequentially connected to each other. FIG. 15 illustrates the three collecting units 301, 302, and 303. However, the number of collecting units may be increased or decreased based on a required length of the oil fence.

Each of the collecting units 301, 302, and 303 may be manufactured to have the same structure and adjacent edges 317 of the adjacent collecting units 301, 302, and 303 may be connected via a link 316. The adjacent collecting units 301, 302, and 303 may be connected to each other to be rotatable, via the link 316. Caps 315 may be provided at both ends of the link 316 for not allowing the link 316 to be separated from the collecting units 301, 302, and 303.

Each of the collecting units 301, 302, and 303 may include the oil filtration membrane 312, and the frame 313 supporting the oil filtration membrane 312. The frame 313 may include a membrane including a fabric material or a non-transmissive resin material, and thus, may block both water and a material.

The frame 313 may include, at an upper edge thereof, a floating member supporter 313a accommodating and supporting the floating member 311. Also, the frame 313 may include, at a lower edge thereof, a weight supporter 313b accommodating and supporting the weight 314.

The frame 313 may include a plurality of penetrating holes 313h. The penetrating holes 313h may allow water to contact and pass through the oil filtration membrane 312. That is, the oil filtration membrane 312 exposed through the penetrating holes 313h may contact and allow the water to pass through the oil filtration membrane 312, to thus filter and collect materials included in the water.

Figure 16:
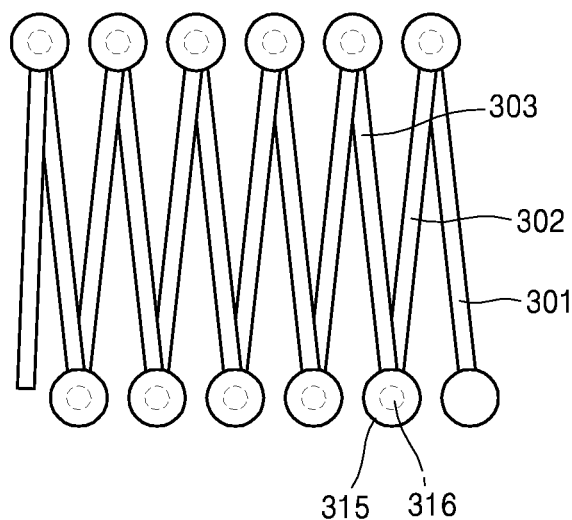
FIG. 16 is a top view of the portion illustrated in FIG. 15.

FIG. 16 is a top view of the portion illustrated in FIG. 15.

FIG. 16 illustrates a state in which the collecting units 301, 302, and 303 are folded by rotating with respect to one another based on the link 316 such that surfaces of the collecting units 301, 302, and 303, which are toward one another, become more adjacent to one another. As illustrated in FIG. 16, in the state in which the collecting units 301, 302, and 303 are folded, the overall volume of the oil fence decreases, and thus, it becomes convenient to maintain the oil fence in a ship or a warehouse is convenient.

Figure 17:
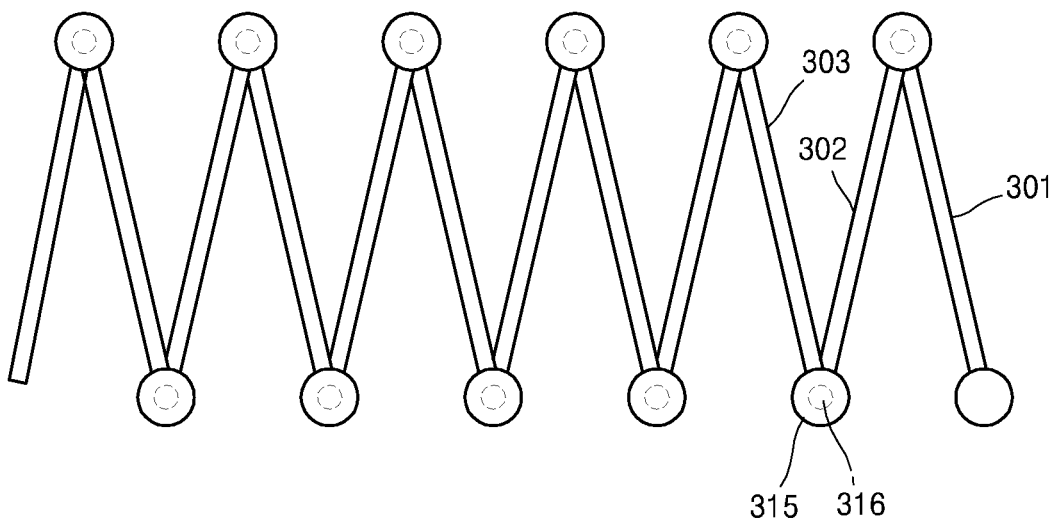
FIG. 17 is an example top view of the oil fence illustrated in FIG. 16, showing the oil fence in a state in which the oil fence is unfolded.

FIG. 17 is an example top view of the oil fence illustrated in FIG. 16, showing the oil fence in a state in which the oil fence is unfolded.

FIG. 17 illustrates a state in which the collecting units 301, 302, and 303 are unfolded by rotating with respect to one another based on the link 316 such that surfaces of the collecting units 301, 302, and 303, which are toward one another, become more distanced from one another.

When the collecting unit 301 is pulled, the collecting units 301, 302, and 303 may rotate with respect to one another to be unfolded. The unfolding of the collecting units 301, 302, and 303 may be performed manually or by using a driving device, such as a motor.

As described above, the oil fence has the structure in which the plurality of collecting units 301, 302, and 303 are connected to one another via the link 316. Thus, when the oil collecting operation is performed, the oil fence may be unfolded to be used, and when the oil collecting operation is not performed, the oil fence may be folded to reduce the overall volume of the oil fence.

When some of the collecting units 301, 302, and 303 are damaged, only the collecting units 301, 302, and 303 which are damaged may be replaced, and thus, the maintenance and management of the oil fence may become convenient.

As described above, according to the oil fence including the oil filtration membrane according to the one or more of the above embodiments, while the oil filtration membrane collects materials, the oil filtration membrane may allow water to pass therethrough, and thus, water pressure applied to the oil fence may be minimized. Thus, a phenomenon in which the oil fence is overturned when a ship operates at a high speed or strong currents occur may be minimized. Also, a phenomenon in which the oil is carried away because the oil passes over the oil fence may be minimized.

Also, the oil filtration membrane of the oil fence may be manufactured by using a porous material so that the oil filtration membrane is hydrophilic, and the oil filtration membrane may include the nano-protuberance structure on a surface thereof. Thus, a concentration of oil of a liquid having passed through the filter is highly decreased, and thus, water which was highly purified by passing through the oil fence may be directly discharged.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An oil fence comprising an oil filtration membrane, the oil fence comprising:
    an oil filtration membrane allowing water to pass therethrough, and collecting materials included in the water;
    a plurality of collecting units each comprising a frame configured to block both water and a material and support the oil filtration membrane, and sequentially connected to one another,
    a floating member having a cylindrical shape and connected to an upper edge of the frame of each of the plurality of collecting units;
    a weight having a cylindrical shape and coupled to a lower edge of the frame of each of the plurality of collecting units;
    a link rotatably connecting lateral edges of an adjacent pair of the plurality of collecting units so as to be rotatable with respect to each other; and
    a cap provided at ends of the link for maintaining the link so as not to be separated from the collecting units;
    wherein the oil filtration membrane comprises a core of about 10 to about 500 meshes, a hydrophilic porous layer having pores and arranged on a surface of the core, a plurality of nano-protuberance structures arranged on a surface of the hydrophilic porous layer and comprising a polymer material, wherein the plurality of nano-protuberance structures have a diameter of about 1 to about 100 nm, a length of about 1 to about 10,000 nm, and an aspect ratio of about 1 to about 50, and an inorganic particle arranged at an end of at least one of the plurality of nano-protuberance structures,
    wherein the frame comprises a first frame comprising a plurality of first penetration holes and contacting a surface of the oil filtration membrane, and a second frame comprising a plurality of second penetration holes corresponding the first penetration holes and contacting another surface of the oil filtration membrane, a floating member supporter having a hollow cylindrical shape and coupled to the floating member at the upper edge of the frame, and a weight supporter having a hollow cylindrical shape and coupled to the weight at a lower edge of the frame,
    wherein an exposed portion of the oil filtration membrane is exposed through the first penetrating holes and the second penetrating holes contacts and allows the water to pass through the oil filtration membrane for filtering and collecting materials included in the water,
    wherein the adjacent pair of the plurality of collecting units rotate so as to become close to each other so that the collecting units are folded to decrease an overall volume of the oil fence for maintaining the oil fence in a ship or a warehouse, or the adjacent pair of the plurality of collecting units rotate so as to be distanced from each other so that the collecting units are unfolded, and wherein the hydrophilic porous layer is arranged on the surface of the core, with an adhesion layer interposed between the hydrophilic porous layer and the surface of the core.

2. The oil fence of claim 1, wherein the core comprises a metal, a plastic, or a combination thereof, and the inorganic particle comprises at least one of Ti, Cu, Au, Ag, Cr, Pt, Fe, Al, Si, an alloy thereof, and an oxide thereof.

3. The oil fence of claim 1, wherein the plurality of nano-protuberance structures have a form of nano-hairs, nano-fibers, nano-pillars, nano-rods, or nano-wires.

* * * * *